(12) United States Patent
Roy et al.

(10) Patent No.: US 11,841,916 B2
(45) Date of Patent: Dec. 12, 2023

(54) SYSTEM AND METHOD TO UPDATE A BOOKMARKED DOCUMENT LINK AND AVOID A BROKEN LINK

(71) Applicant: Dell Products L.P., Round Rock, TX (US)

(72) Inventors: Mainak Roy, Kolkata (IN); Swapna M, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/341,451

(22) Filed: Jun. 8, 2021

(65) Prior Publication Data

US 2022/0391465 A1 Dec. 8, 2022

(51) Int. Cl.
| | | |
|---|---|---|
| *G06F 16/955* | (2019.01) | |
| *G06F 16/957* | (2019.01) | |
| *G06F 40/226* | (2020.01) | |
| *G06F 40/134* | (2020.01) | |
| *G06F 13/16* | (2006.01) | |

(52) U.S. Cl.
CPC ...... *G06F 16/9562* (2019.01); *G06F 16/9577* (2019.01); *G06F 40/134* (2020.01); *G06F 40/226* (2020.01); *G06F 13/1668* (2013.01)

(58) Field of Classification Search
None
See application file for complete search history.

(56) References Cited

U.S. PATENT DOCUMENTS

| | | | | |
|---|---|---|---|---|
| 7,689,667 | B2 * | 3/2010 | Lal | H04L 69/40 715/208 |
| 7,783,979 | B1 * | 8/2010 | Leblang | G06F 16/9566 709/227 |
| 8,280,981 | B2 * | 10/2012 | Olliphant | G06F 16/9577 709/250 |
| 8,676,798 | B1 * | 3/2014 | Datta | G06F 16/958 707/706 |
| 9,846,749 | B2 * | 12/2017 | Cai | G06F 3/04817 |
| 11,102,232 | B2 * | 8/2021 | Kozloski | H04L 9/3239 |
| 2002/0052916 | A1 * | 5/2002 | Kloba | H04L 67/06 709/213 |
| 2002/0156781 | A1 * | 10/2002 | Cordray | G06F 16/95 707/999.009 |
| 2003/0158953 | A1 * | 8/2003 | Lal | H04L 69/40 709/218 |
| 2003/0221167 | A1 * | 11/2003 | Goldstein | G06F 16/9577 715/201 |
| 2004/0083215 | A1 * | 4/2004 | de Jong | H04L 63/123 |
| 2005/0223093 | A1 * | 10/2005 | Hanson | H04L 67/535 709/224 |

(Continued)

*Primary Examiner* — Maikhanh Nguyen
(74) *Attorney, Agent, or Firm* — Terrile, Cannatti & Chambers; Emmanuel A. Rivera

(57) ABSTRACT

A system, method, and computer-readable medium for providing updated and new document links to documents of a website is described. An indication is received that a user device has bookmarked a document link on the website. Determination is performed when the user device visits/revisits the website with the document link. An assessment is performed as to the validity of the document link. If the document link is not valid, the user device is informed that an updated or new document link is available, and the updated or new document link is provided.

14 Claims, 5 Drawing Sheets

(56) References Cited

U.S. PATENT DOCUMENTS

| | | | | |
|---|---|---|---|---|
| 2006/0224967 A1* | 10/2006 | Marmaros | ............ | G06F 16/9562 |
| | | | | 707/E17.112 |
| 2009/0164564 A1* | 6/2009 | Willis | ................. | G06F 16/9562 |
| | | | | 715/760 |
| 2010/0153544 A1* | 6/2010 | Krassner | ............... | G06F 40/143 |
| | | | | 709/224 |
| 2011/0087966 A1* | 4/2011 | Leviathan | ............ | G06F 16/9577 |
| | | | | 715/745 |
| 2012/0066359 A1* | 3/2012 | Freeman | ............ | G06Q 30/0256 |
| | | | | 709/223 |
| 2012/0331409 A1* | 12/2012 | Olliphant | ............ | G06F 16/9577 |
| | | | | 715/760 |
| 2014/0019518 A1* | 1/2014 | Nepper | ............... | G06F 16/9574 |
| | | | | 709/203 |
| 2014/0108901 A1* | 4/2014 | Carriero | ............. | G06F 16/9562 |
| | | | | 715/206 |
| 2017/0083629 A1* | 3/2017 | Cai | .................... | G06F 16/9574 |

\* cited by examiner

SYSTEM AND METHOD TO UPDATE A BOOKMARKED DOCUMENT LINK AND AVOID A BROKEN LINK

BACKGROUND OF THE INVENTION

Field of the Invention

The present invention relates to the management of information handling systems. More specifically, embodiments of the invention provide a system, method, and computer-readable medium for updating bookmarked document links and avoiding broken document links.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information.

Internet users through the use of information handling systems may access documents on a website and bookmark a link to the document. In particular, bookmarking can be performed on a document page (e.g., pdf or html). In certain instances, the bookmarked document link may be updated (e.g., a new link) or become deprecated (e.g., no longer available). When clicking on (i.e., activating) the bookmarked document link, the user may receive a "404 error" code indicating that the resource or document is not available. The user may not be able to search back as to the content of the document. Typically, the user does not know if the bookmarked document link has been updated or has become deprecated.

A user visiting a website that provides the document link can experience frustration in not being able to access the document with valuable information. Such negative experiences can lead to a lack in confidence with the provider of the document and related products and services.

SUMMARY OF THE INVENTION

A system, method, and computer-readable medium for providing updated and new document links to documents of a website is described. An indication is received that a user device has bookmarked a document link on the website. Determination is performed when the user device visits/revisits the website with the document link. An assessment is performed as to the validity of the document link. If the document link is not valid, the user device is informed that an updated or new document link is available, and the updated or new document link is provided.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for performing updating bookmarked document links and avoiding broken document links.

Implementations provide to proactively provide information that changes have been made as to bookmarked document links or pages. Updates and notifications are provided if bookmarked document links or pages are updated or have become deprecated, allowing users or customers to update their bookmarked document links.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

It is further to be understood that one or more information handling systems may be implemented, such as multiple server computing systems. In certain embodiments, cloud computing may be implemented, performing the methods described herein.

Figure 1:
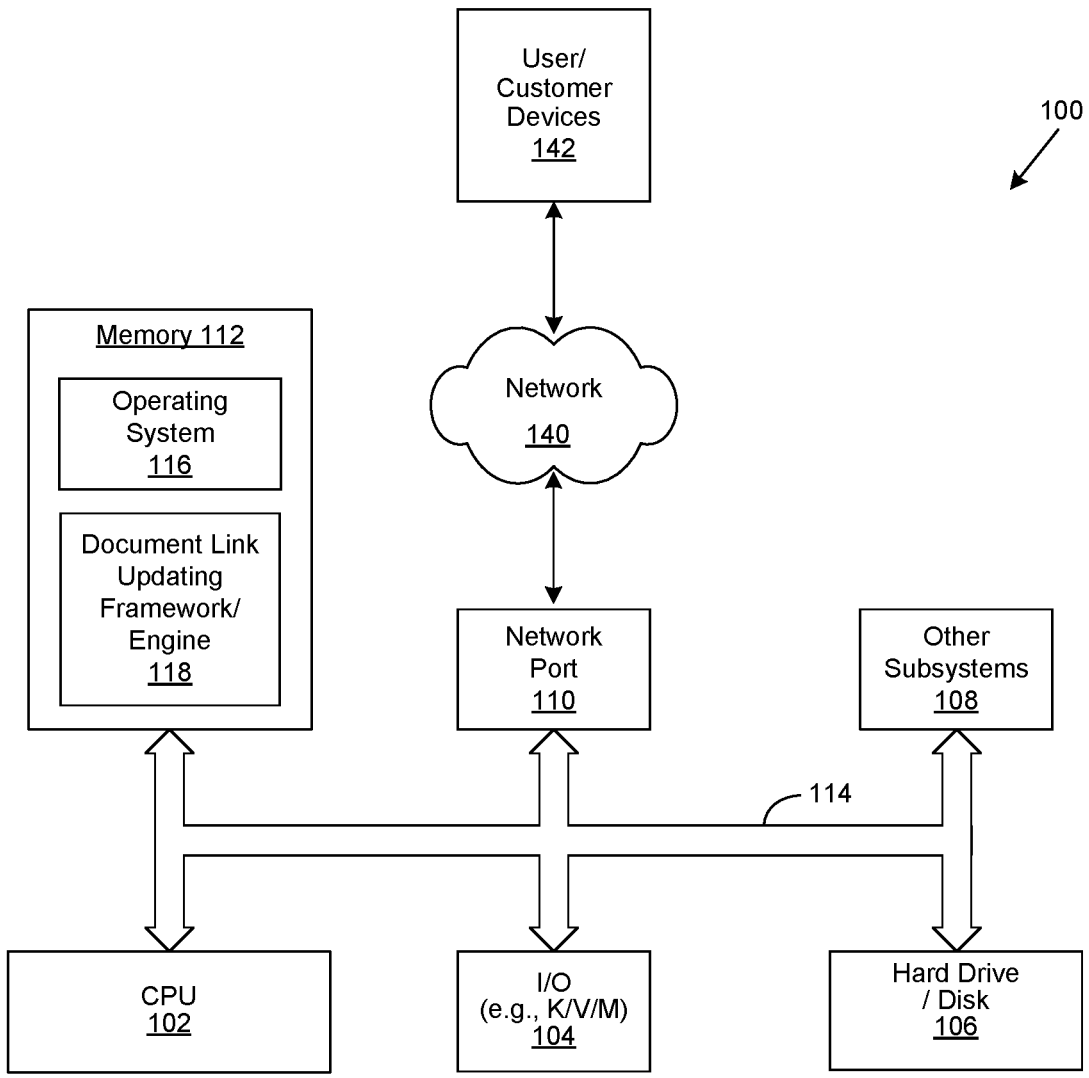
FIG. 1 is a general illustration of components of an information handling system as implemented in the system and method of the present invention.

FIG. 1 is a generalized illustration of an information handling system that can be used to implement the system and method of the present invention. The information handling system 100 includes processors (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by user/customer devices 142. The network 140 may be a public network, such as the Internet, a physical private network, a wireless/wired network, a virtual private network (VPN), or any combination thereof. Skilled practitioners of the art will recognize that many such embodiments are possible, and the foregoing is not intended to limit the spirit, scope or intent of the invention.

The information handling system 100 likewise includes system memory 112, which is interconnected to the foregoing via one or more buses 114. System memory 112 further includes operating system (OS) 116. Certain embodiments provide for the information handling system 100 to be implemented as a server computer, computing device, stand-alone workstation, etc. In various embodiments, the system memory 112 includes a document link updating framework/engine 118 further described herein.

Figure 2:
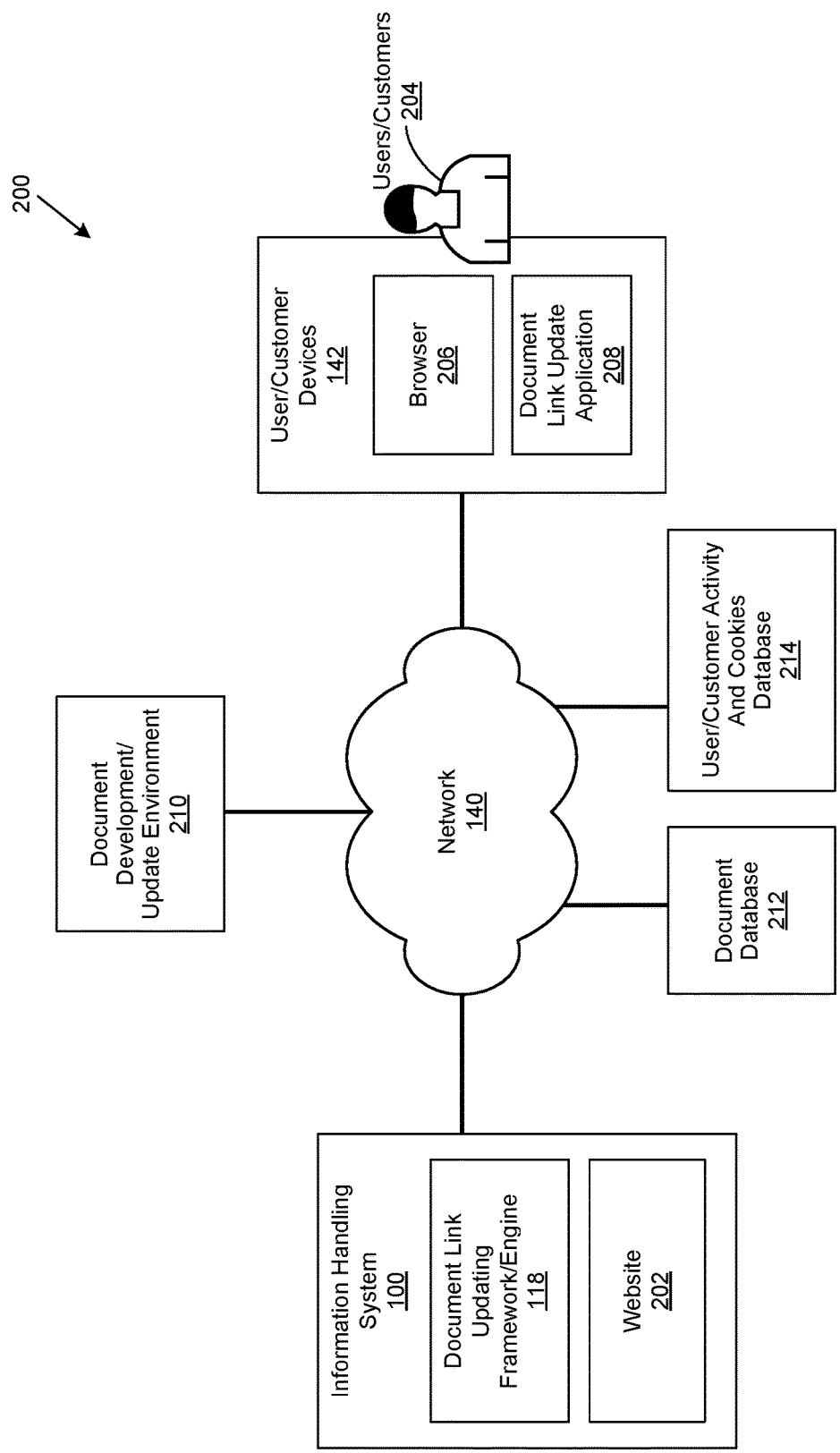
FIG. 2 is a simplified block diagram of a system that provides for updating document links and avoiding broken document links.

FIG. 2 is a simplified block diagram of a system for updating document links and avoiding broken document links. The system 200 includes the information handling system 100. As discussed, certain embodiments, the information handling system 100 can be implemented using one or more systems, such as multiple server computers. Embodiments also include the use of cloud computing.

As discussed, the information handling system 100 includes document link updating framework/engine 118. Various implementations provide for the information handling system 100 to include a website 202 accessible by user/customer devices 142. In particular, the website 202 provides access to documents or document pages (e.g., pdf or html). As discussed, the information handling system 100 can be connected to and accessed by user/customer devices 142 through network 140. The network 140 may be a public network, such as the Internet, a physical private network, a wireless/wired network, a virtual private network (VPN), or any combination thereof.

The user/customer devices 142 can refer to an information handling system such as a personal computer, a laptop computer, a tablet computer, a personal digital assistant (PDA), a smart phone, a mobile telephone, or other device that is capable of communicating and processing data. The user/customer devices 142 are accessible by users/customers 204.

The users/customers 204 may be customers of products and/or services of a provider that operates information handling system 100 and website 202. In particular, users/customers 204 may look for documents related to particular products and/or services. Implementations provide for the user/customer devices 142 to include a web browser 206 to access website 202 that provides access to documents or document pages (e.g., pdf or html). In certain implementations, the documents or document pages are bookmarked as document links by the user/customer devices 142 for future reference.

Implementations provide for the user/customer devices 142 to include a document link update application 208. Updated documents links can be provided to the user/customer devices 142 from the document link updating framework/engine 118.

In certain embodiments the system 200 includes a document development/update environment 210 which provides for new and updated documents. The documents can be assigned a document link by the information handling system 100, and particularly through website 202.

Implementations provide for the system 200 to include a document database 212 in which documents and document links may be stored. Implementations also can provide for the system 200 to include a user/customer activity and cookies database 214 in which activities of users/customers 204 and user/customer devices 142 are tracked. In particular, logs of visits to the website 202 to access documents by document links are tracked, as further described herein.

Figure 3:
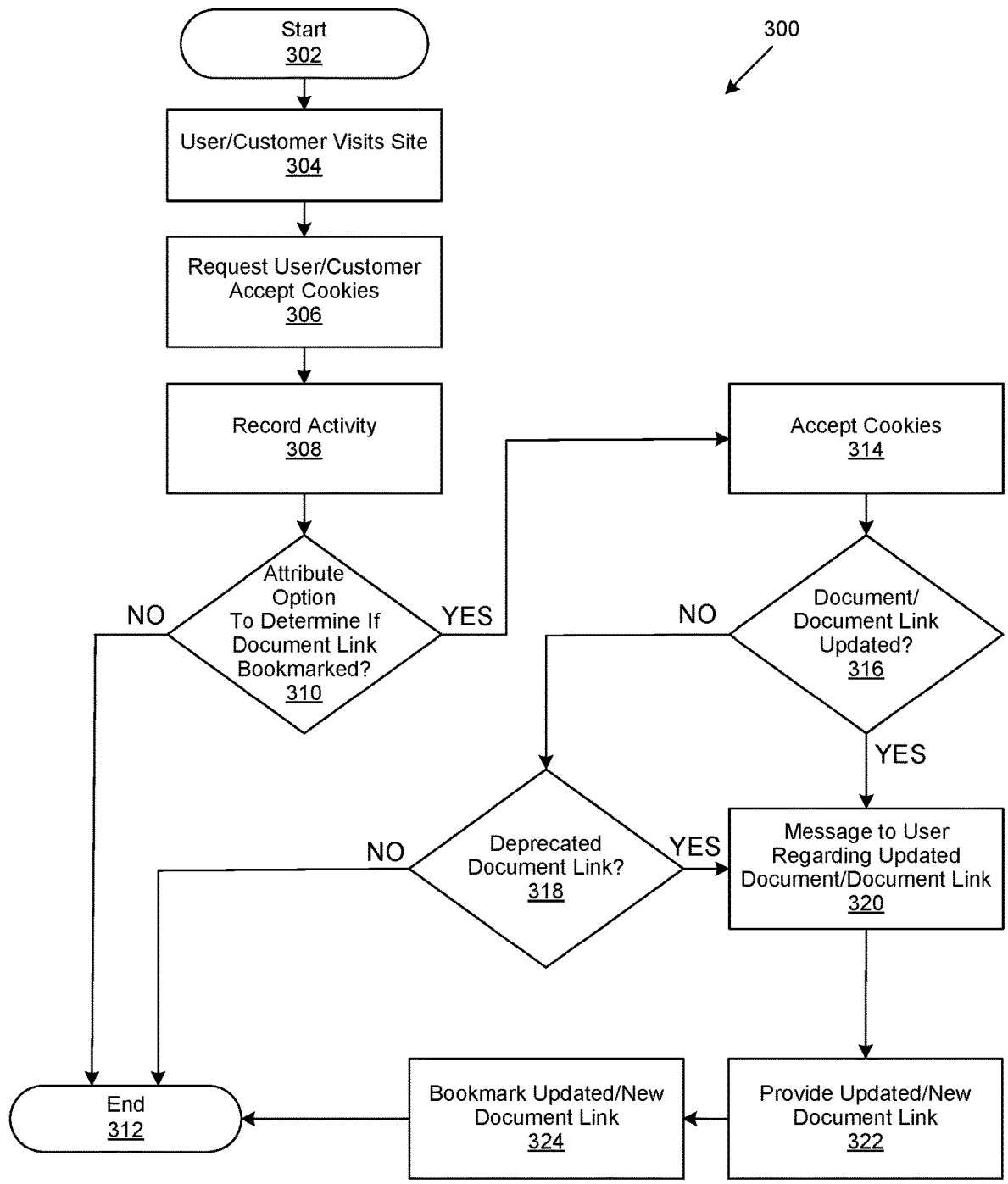
FIG. 3 is a generalized flowchart for updating document links and avoiding broken document links.

FIG. 3 is a generalized flowchart for updating document links and avoiding broken document links. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 302, the process 300 begins. At step 304, through user/customer device 142, a user/customer 204 visits a website, such as a product/support website. Website 202 is an example. Browser 206 at user/customer device 142 may be used to access the website 202.

At step 306, a request is returned to the user/customer device 142 to accept cookies from the website (e.g., website 202), where cookies are text files with pieces of data, and can include a particular cookie schema. Accepting cookies may be performed through the browser 206, and the request can be made when the website 202 is visited.

In certain embodiments, cookies are used to provide an attribute option in the cookie schema that shows whether users/customers 204 have bookmarked a document link at website 202. In certain implementations, the browser 206 may request to accept the cookies again when there is a change in policy by the document provider (e.g., product and/or service provider), and when user/customer visits any document pages.

Activities or visits to the website 202 by and cookies sent to users/customers 204 and the cookies sent to users/customers 204 may be kept in user/customer activity and cookies database 214. Implementations provide that when document links are updated, a determination can be made to as to which and how many users/customers 204 have bookmarked particular document pages.

At step 310, a determination is made if a user/customer 204 has bookmarked as document link. If a document link is not bookmarked, following the "NO" branch of step 310, the process 300 ends. If a document link is bookmarked, following the "YES" branch of step 310, at step 314, cookies are accepted by the user/customer device 142.

At step 316, a determination is performed if a document/document link is updated. If the document/document link is not updated, at step 318, a determination is made if there is a deprecated document link. If there is no deprecated document link, following the "NO" branch of step 320, at step 312, the process 300 ends.

If there is an updated document link following the "YES" branch of step 316, at step 320 a message is provided to the user/customer device 142. An example of such a message may be "Updated document is available. Do you want to bookmark the document?" At step 322, the updated document link is provided to the user/customer device 142. At step 324 the updated document link is bookmarked. At step 312, the process 300 ends.

If there is a deprecated document link following the "YES" branch of step 318, at step 320 a message is provided to the user/customer device 142. An example of such a message may be "404 error, bookmarked page is deprecated. For latest document go to <doc link>". At step 322, the new document link is provided to the user/customer device 142. At step 324 the updated document link is bookmarked. At step 312, the process 300 ends.

Figure 4:
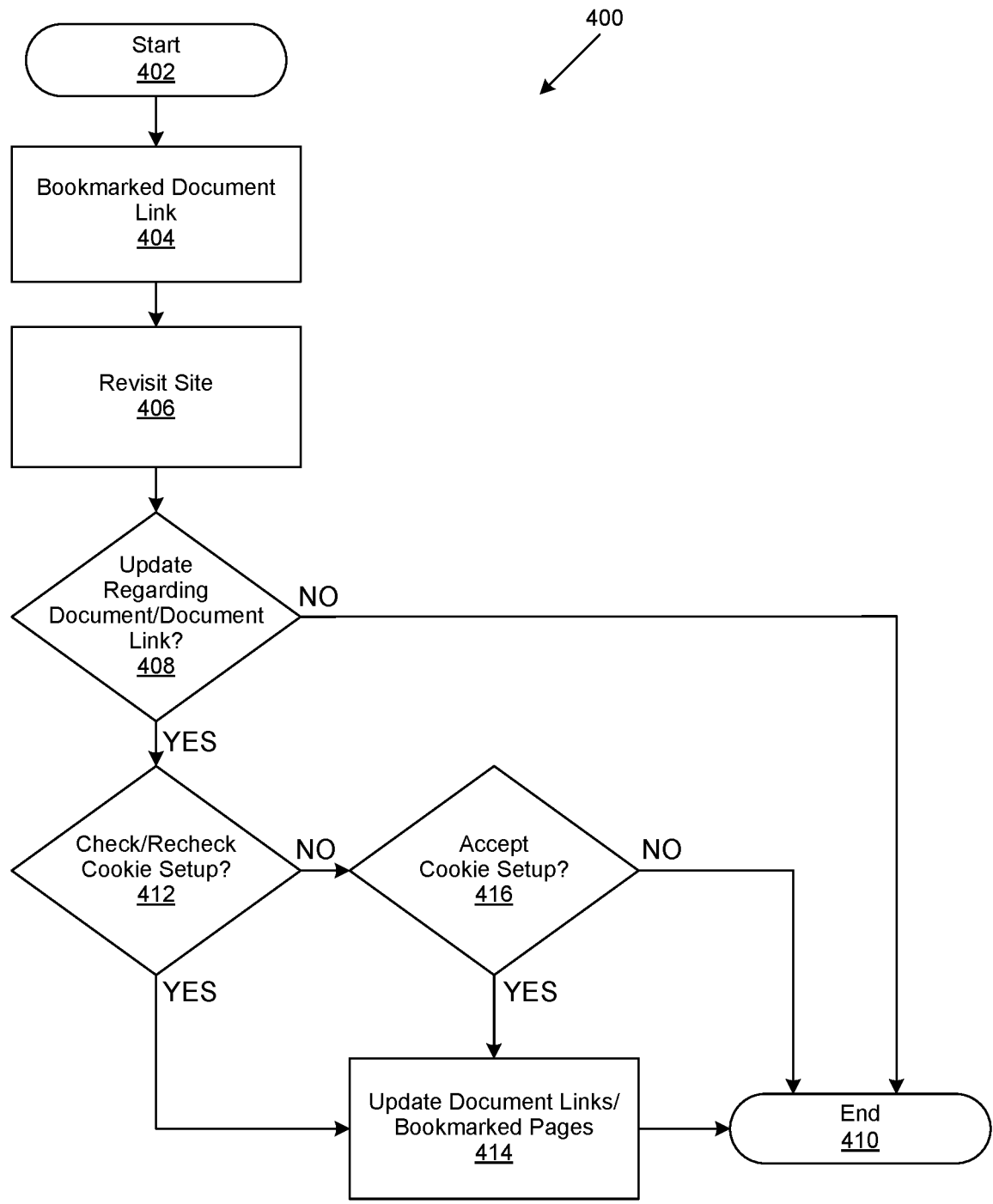
FIG. 4 is a generalized flowchart as to operation in real time of an attribute option in a cookie schema.

FIG. 4 is a generalized flowchart for as to operation in real time of an attribute option in a cookie schema. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 402, the process 400 begins. At step 404, a document link is determined to be bookmarked by a user/customer 204 (i.e., user/customer device 142). At step 406, the user/customer 204 (i.e., user/customer device 142) through browser 206 is determined to visit website 202. At step 408, a determination is performed whether there is an update to document/document link. The update includes new updated documents and document links, and deprecated document links.

If there are no updates as to documents/document links, following the "NO" branch of step 408, at step 410, the process 400 ends. If there are updates as to documents/document links, following the "YES" branch of step 408, at step 412, a determination is made to check/recheck the cookie setup.

If there is a check/recheck as to the cookie setup, following the "YES" branch of step 412, at step 414, an update is performed as to document links/bookmarked pages. At step 410, the process 400 ends.

If there is a no check/recheck as to the cookie setup, following the "NO" branch of step 412, at step 416, a determination is performed to accept the cookie setup. If the cookie setup is not accepted, following the "NO" branch of step 416, the process 400 ends.

If the cookie setup is accepted, following the "YES" branch of step 416, at step 414, an update is performed as to document links/bookmarked pages. At step 410, the process 400 ends.

Figure 5:
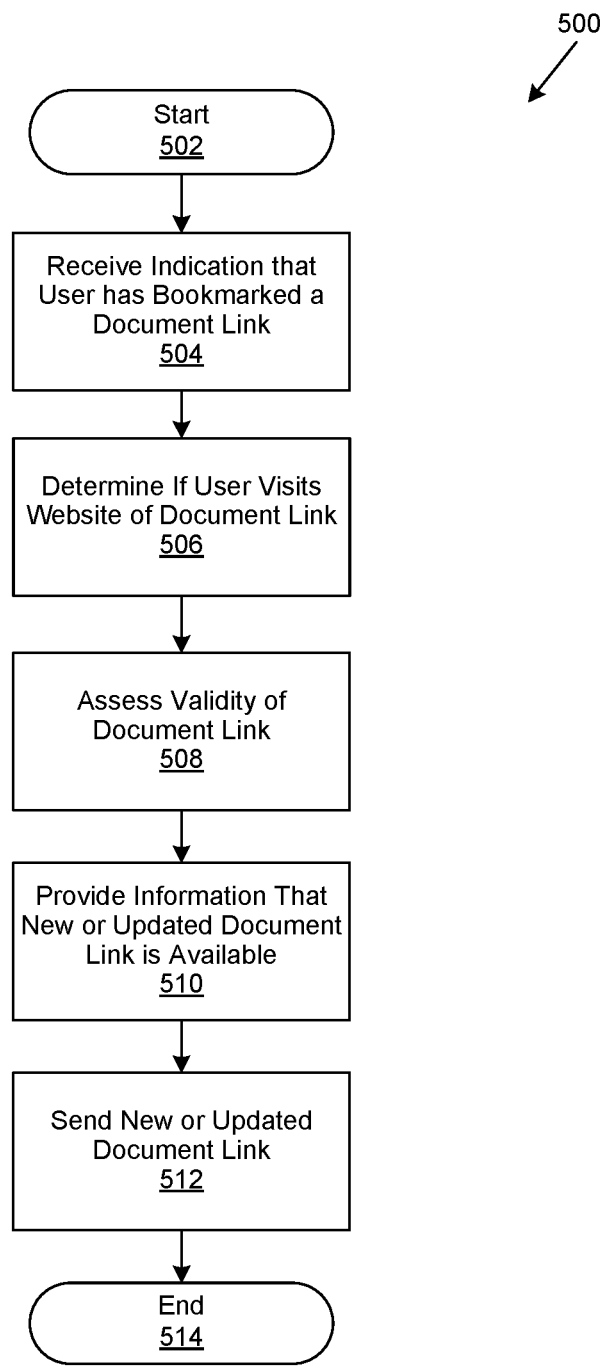
FIG. 5 is a generalized flowchart for providing updated and new document links to documents of a website.

FIG. 5 is a generalized flowchart for providing updated and new document links to documents of a website. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 502, the process 500 begins. At step 504, an indication is received that a user/customer 204 has bookmarked a document link from the website 202. At step 506, a determination is made if the user/customer 204 revisits the website with the document link. At step 508, an assessment is performed as to validity of the document link, whether the document link has been updated or has been deprecated. At step 510, information is provided that there is an updated or new document link. At step 512, the new or updated document link is sent. At step 514, the process 500 ends.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method to provide updated and new document links to documents of a website comprising:
   receiving an indication through a data schema that a user device has bookmarked a document link on the website;
   determining if the user device revisits the website using the bookmarked document link;
   determining using the data schema if the user device revisits the website through cookies sent by user devices, wherein the cookies are used to track user devices that visit the website;
   assessing the validity of the document link when user devices visit the website;
   providing information to the user device if an updated, deprecated, or new document link is available, wherein the updated document links are to updated documents and new documents are to deprecated document links;
   determining to a check/recheck of a cookie setup, wherein cookies are implemented for the determining if user device visits the website and allowing a choice to accept the cookies;
   performing an update as to the document link to the website if it is determined that the check/recheck is performed; and
   sending the updated or new document link to the website to the user device.

2. The method of claim 1, wherein the data schema is implemented in cookies.

3. The method of claim 1, wherein the visits of the user device are tracked and logged.

4. The method of claim 1, wherein the providing information is a message on a browser of the user device.

5. The method of claim 1 further comprising rechecking the data schema.

6. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations comprising instructions executable by the processor and configured for:
   receiving an indication through a data schema that a user device has bookmarked a document link on the website;
   determining if the user device revisits the website using the bookmarked document link;
   determining using the data schema if the user device revisits the website through cookies sent by user devices, wherein the cookies are used to track user devices that visit the website;
   assessing the validity of the document link when user devices visit the website;
   providing information to the user device if an updated, deprecated, or new document link is available, wherein the updated document links are to updated documents and new documents are to deprecated document links;
   determining to a check/recheck of a cookie setup, wherein cookies are implemented for the determining if user device visits the website and allowing a choice to accept the cookies;
   performing an update as to the document link to the website if it is determined that the check/recheck is performed; and
   sending the updated or new document link to the website to the user device.

7. The system of claim 6, wherein the data schema is implemented in cookies.

8. The system of claim 6, wherein the visits of the user device are tracked and logged.

9. The system of claim 6, wherein the providing information is a message on a browser of the user device.

10. The system of claim 6 further comprising rechecking the data schema.

11. A non-transitory, computer-readable storage medium embodying computer program code, the computer program code comprising computer executable instructions configured for:
   receiving an indication through a data schema that a user device has bookmarked a document link on the website;
   determining if the user device revisits the website using the bookmarked document link;
   determining using the data schema if the user device revisits the website through cookies sent by user devices, wherein the cookies are used to track user devices that visit the website;
   assessing the validity of the document link when user devices visit the website;
   providing information to the user device if an updated, deprecated, or new document link is available, wherein the updated document links are to updated documents and new documents are to deprecated document links;
   determining to a check/recheck of a cookie setup, wherein cookies are implemented for the determining if user device visits the website and allowing a choice to accept the cookies;
   performing an update as to the document link to the website if it is determined that the check/recheck is performed; and
   sending the updated or new document link to the website to the user device.

12. The non-transitory, computer-readable storage medium of claim 11, wherein the data schema is implemented in cookies.

13. The non-transitory, computer-readable storage medium of claim 11, wherein the visits of the user device are tracked and logged.

14. The non-transitory, computer-readable storage medium of claim 11 further comprising further comprising rechecking the data schema.

* * * * *